US011282038B2

(12) United States Patent
Inampudi et al.

(10) Patent No.: US 11,282,038 B2
(45) Date of Patent: Mar. 22, 2022

(54) INFORMATION SYSTEM WITH EMBEDDED INSIGHTS

(71) Applicant: ADP, Inc., Roseland, NJ (US)

(72) Inventors: Sivakiran Inampudi, Hyderabad (IN); Hafeez Raji, Huntington, NY (US); Donald E. Studley, III, Maplewood, NJ (US); Madhulika Chilakapati, Hyderabad (IN); Brenda V. Vega, Westfield, NJ (US); Parthasarathi Datta, Hyderabad (IN); Pradeep Kumar Vasu, Hyderabad (IN); Amitkumar V. Patel, Roseland, NJ (US)

(73) Assignee: ADP, Inc., Roseland, NJ (US)

( * ) Notice: Subject to any disclaimer, the term of this patent is extended or adjusted under 35 U.S.C. 154(b) by 622 days.

(21) Appl. No.: 15/433,787

(22) Filed: Feb. 15, 2017

(65) Prior Publication Data

US 2018/0232697 A1 Aug. 16, 2018

(51) Int. Cl.
*G06Q 10/10* (2012.01)
*G06F 16/2457* (2019.01)
*G06F 16/248* (2019.01)

(52) U.S. Cl.
CPC ......... *G06Q 10/105* (2013.01); *G06F 16/248* (2019.01); *G06F 16/24575* (2019.01)

(58) Field of Classification Search
CPC ....... G06Q 10/1053; G06Q 10/063112; G06Q 10/105–10/1057

(Continued)

(56) References Cited

U.S. PATENT DOCUMENTS 9,098,831 B1   8/2015 Miles et al.
9,569,729 B1 * 2/2017 Oehrle ................ G06Q 10/063
(Continued)

FOREIGN PATENT DOCUMENTS

EP   1804212 A1   7/2007

OTHER PUBLICATIONS

Esposito, M., & Novak, J. (2002). Small steps, big savings: The eHR solutions that have the biggest budget impact are the ones that affect the most people the most often. (software & technology). Workforce, 81(10), S58(24). Retrieved from http://dialog.proquest.com (Year: 2002).*

(Continued)

*Primary Examiner* — Sangeeta Bahl
*Assistant Examiner* — Joshua D Schneider
(74) *Attorney, Agent, or Firm* — Yee & Associates, P.C.

(57) ABSTRACT

A method, computer system, and computer program product for displaying contextually relevant insights into human resources information. Human resources information from a human resources profile of an employee of an organization is displayed within a context of an operation to be performed for the organization. The human resources information is identified within related information. Whether the related information is relevant to the context of the operation to be performed is determined. In response to determining that the related information is relevant to the context of the operation to be performed, an insight into the human resources information is generated based on a data point for the human resources information within the related information. The insight is displayed with the human resources information within the context of the operation to be performed. Performing the operation is enabled using the insight displayed with the human resources information.

21 Claims, 16 Drawing Sheets

(58) Field of Classification Search
USPC .................................. 705/320, 321, 325
See application file for complete search history.

(56) References Cited

U.S. PATENT DOCUMENTS

| | | | | |
|---|---|---|---|---|
| 2003/0130881 | A1* | 7/2003 | Calderaro | G06Q 10/063112 |
| | | | | 705/7.14 |
| 2005/0108396 | A1 | 5/2005 | Bittner | |
| 2009/0132313 | A1 | 5/2009 | Chandler et al. | |
| 2010/0100427 | A1* | 4/2010 | McKeown | G06Q 10/067 |
| | | | | 705/322 |
| 2010/0100464 | A1* | 4/2010 | Ellis | G06Q 10/06 |
| | | | | 705/33 |
| 2010/0306017 | A1 | 12/2010 | Dreyfuss et al. | |
| 2011/0106581 | A1* | 5/2011 | Rohrbasser | G06Q 30/0201 |
| | | | | 705/7.29 |
| 2013/0013327 | A1* | 1/2013 | Horseman | A61B 5/01 |
| | | | | 705/1.1 |
| 2013/0268889 | A1 | 10/2013 | Barak et al. | |
| 2013/0275321 | A1 | 10/2013 | Chuang | |
| 2014/0279628 | A1* | 9/2014 | Straznitskas | G06Q 10/105 |
| | | | | 705/320 |
| 2014/0324521 | A1* | 10/2014 | Mun | G06Q 10/04 |
| | | | | 705/7.28 |
| 2015/0081396 | A1* | 3/2015 | Miller | G06F 16/21 |
| | | | | 705/7.36 |
| 2015/0248644 | A1* | 9/2015 | Zenger | G06Q 10/105 |
| | | | | 705/320 |
| 2016/0306965 | A1* | 10/2016 | Iyer | G06F 21/552 |
| 2016/0314423 | A1* | 10/2016 | Mole | G06Q 10/06393 |

OTHER PUBLICATIONS

William H. Mobley et al., "A Review and Conceptual Analysis of the Employee Turnover Process", May 1979, Psychological Bulletin 86(3): 493-522 (Year: 1979).*

SHRM Foundation, "Use of Workforce Analytics for Competitive Advantage", May 2016, https://www.shrm.org/ (Year: 2016).*

David G. Allen, "Retaining Talent", 2008, https://www.shrm.org/ (Year: 2008).*

"Human Resource Information Management System," accessed Nov. 1, 2016, 1 page. https://sc02.alicdn.com/kf/HTB1aRBQLXXXXXXwXFXXq6xXFXXXS/Human-Resource-Software.jpg.

Pimpale, "HR Management Software User Interface Design," Oct. 20, 2011, 5 pages. https://www.behance.net/gallery/2348906/HR-Management-Software-User-Interface-Design.

* cited by examiner

FIG. 4

Green Company — 405

HOME  RESOURCES  MYSELF  MY TEAM  PEOPLE  PROCESS  REPORTS  SETUP

402 — Employment Profile — 404

Crompton, Anthony
Sales Associate II
Marketing Department

| Tax ID(SSN) | Position ID | Hire Date | Status |
|---|---|---|---|
| XXX-XX-XXXX | Q2001110 | 01/01/1970 | Active |

Employee Search   <STATUS IS ACTIVE>   < 1 of 68 >

Position — 406

| | | |
|---|---|---|
| Sales Associate | Reports to<br>Janet Rockford | |
| Position Start Date<br>March 3, 2013 | Management Position<br>No | |
| Job Function | Pay Grade<br>Sales Level 1 | |
| Job Change Reason<br>Promotion | Position ID<br>100101 | |
| Job Class | Company Code<br>GQ2 | |
| FLSA<br>Exempt | File Number<br>100101 | |
| NAICS Workers' Comp | | |
| EEOC Job Classification | | |
| Officer/Owner | | |

Status — 408

| | | |
|---|---|---|
| Active | Hire Date<br>January 1, 1990 | |
| Rehire Date<br>March 3, 2013 | Rehire Reason | |
| Leave Return Date | Leave Return Reason | |
| Hire Reason<br>New Position | | |
| Supporting Documents | | |

Regular Pay — 410

| | | |
|---|---|---|
| $4,207.53<br>Salary | Annual Salary<br>$109,395.78 | Pay Frequency<br>Biweekly |
| Premium Rate Factors<br>1.0 x 1.5 | Rate 2 (More Rates) | Standard Hours<br>80 |
| Use FLSA Overtime<br>No | | Change Reason |
| Cancel Automatic Pay<br>No | | |
| Tipped Employee | | |

Employment — 414

| | | |
|---|---|---|
| Employee Type<br>Full Time | Seniority Date<br>January 1, 2010 | |
| Associate ID<br>Full Time | Credited Service Date<br>January 1, 2010 | |
| Hire source | Adjusted Service Date | |
| Normal Retirement Date<br>January 1, 2030 | | |
| Early Retirement Date | | |

Additional Earnings
Show Active Only

Work Schedule — 416

| | | |
|---|---|---|
| FTE | Blackout Calendar | |
| Assigned Shift | Default Request Hours | |
| Scheduled Hours | Default Start Time | |
| Hours Period | Accrual Date | |

Custom Fields

‹ EMPLOYMENT PROFILE
Related Insights ⓘ  600

RELATED METRIC 602
TOTAL | Q4 - 2015
520 +34
vs. Last Quarter

Total Hours
(bar chart: 100, 75, 50, 25, 0)
▨ Full Time  ▨ Part Time

EMPLOYEE PROFILE 402
Anthony Crompton
Manager
Associate ID
Active
✉ a.compton@gotg.com
☎ 973-555-0000 Ex. 4444
  973-555-4444

🏢 Department UXS
📍 Location New Jersey
🗂 Reports to Mr B. Smith

RELATED REPORT 604
Last Run on 07/22/2016. Report last edited on 10/21/2015. ↻

| MANAGER ID | LAST NAME |
|---|---|
| 10048 | Fuentes |
| 10085 | Price |
| 10187 | Andrews |
| 10663 | Lowe |
| 10665 | Smith |
| 10679 | Mariano |
| 10765 | Ericson |

RELATED METRIC 606
TOTAL | Q4 - 2015
733 -48
vs. Last Quarter

HEADCOUNT
(line chart: 1000, 750, 500, 250, 0)
○ HEADCOUNT

RELATED METRIC
TOTAL | Q4 - 2015

( + ADD AN INSIGHT )

400

< RELATED INSIGHTS

Terminations by Manager (i) SHARED WITH YOU ⋯ RUN |

RUN DATE: 07/22/2016 5:57:59 PM EST   ,ıl ANALYZE DATA   EXPORT ⌄

≡ Grouping ⌄ | Σ Functions ⌄ | ↓≡ Sorting ⌄

| MANAGER ID (?) | LAST NAME | FIRST NAME | TERMINATION COUNT | EMPLOYEE STATUS C |
|---|---|---|---|---|
| 10048 | Fuentes | Carlos | 3.00 | T |
| 10085 | Price | Jonathan | 2.00 | T |
| 10187 | Andrews | Jonathan | 1.00 | T |
| 10595 | Hilton | Jonathan | 2.00 | T |
| 10604 | Kim | Jacob | 1.00 | T |
| 10663 | Lowe | Jonathan | 2.00 | T |
| 10665 | Smith | William | 2.00 | T |
| 10679 | Mariano | Tony | 1.00 | T |
| 10765 | Ericson | Jonathan | 2.00 | T |
| 10788 | Smalls | Heather | 1.00 | T |
| 10935 | Avery | Jonathan | 2.00 | T |

↗ 700

Run History

| RUN DATE | RECORDS | |
|---|---|---|
| 07/22/2016, 05:57 PM EST | 64 | (8) |

EXPORT ⌄   VIEW ⌄

Green Company | HOME RESOURCES MYSELF MY TEAM PEOPLE PROCESS REPORTS SETUP | Search | Susan Troy

— 902

Anthony has been flagged as a potential risk in Turnover Probability. ( VIEW DETAILS )

— 402

Employment Profile

Crompton, Anthony | Tax ID(SSN) | Position ID | Hire Date | Status | Employee Search
Sales Associate II | XXX-XX-XXXX | Q2001110 | 01/01/1970 | Active | <STATUS IS ACTIVE>  < 1 of 68 >
Marketing Department

Position

| | | | |
|---|---|---|---|
| Sales Associate | Reports to<br>Janet Rockford | | |
| Position Start Date<br>March 3, 2013 | Management Position<br>No | | |
| Job Function | Pay Grade<br>Sales Level 1 | | |
| Job Change Reason<br>Promotion | Position ID<br>100101 | | |
| Job Class | Company Code<br>GQ2 | | |
| FLSA<br>Exempt | File Number<br>100101 | | |
| NAICS Workers' Comp | | | |
| EEOC Job Classification | | | |
| Officer/Owner | | | |

↗ Status

| | | | |
|---|---|---|---|
| Active | Rehire Date<br>March 3, 2013 | Rehire Reason | |
| | Leave Return Date | Leave Return Reason | |
| | Hire Reason<br>New Position | | |
| | Supporting Documents | | |

Employment

| | | | |
|---|---|---|---|
| Employee Type<br>Full Time | Seniority Date<br>January 1, 2010 | | |
| Associate ID<br>Full Time | Credited Service Date<br>January 1, 2010 | | |
| Hire source | Adjusted Service Date | | |
| Normal Retirement Date<br>January 1, 2030 | | | |
| Early Retirement Date | | | |

○ Regular Pay

| | | | |
|---|---|---|---|
| $4,207.53<br>Salary | | | |
| Annual Salary<br>$109,395.78 | Rate 2 (More Rates) | | |
| Premium Rate Factors<br>1.0 x 1.5 | Standard Hours<br>80 | | |
| Use FLSA Overtime<br>No | Change Reason | | |
| Cancel Automatic Pay<br>No | | | |
| Tipped Employee | | | |

Work Schedule

| | | | |
|---|---|---|---|
| FTE | Blackout Calendar | | |
| Assigned Shift | Default Request Hours | | |
| Scheduled Hours | Default Start Time | | |
| Hours Period | Accrual Date | | |

Corporate Groups

HOME  MY COMPANY  MYSELF  PEOPLE  PROCESS  REPORTS  SETUP

Termination / Retirement (?)

BV  Barbara Rivera
     Nurse Manager, Health Care
     NEW SEARCH

Employee ID  Status
613850       Active

Select an Activity

[              v ]  START ACTIVITY

< BACK

Insights for Mary White
Data from Q1 2016

Turnover Rate                                      1302

Manager                    Department
15.6% +5.4                 13.2% +3.8
vs. ADP Benchmark          vs. ADP Benchmark 1304
Headcount
Open Reqs                                              4
Active Headcount                                       27

High Risk      ◎◎                                      2

Med Risk       ◎◎◎                                     3

Low Risk       ○○○○○○○○○○
               ○○○○○○○○○○                              22
               ○○

Terminations   ○○○○
(Voluntary)    ○○○                                     7

Top Termination Reasons (Voluntary)                1306

Manager
Mary White (?)  ▸ ▦  [ 0 / 5 ]  Comments

HOME  MY COMPANY  MYSELF  PEOPLE  PROCESS  REPORTS  SETUP

1106 — Go to New Design

Termination / Retirement (?)

BV  Barbara Rivera
    Nurse Manager, Health Care
    NEW SEARCH

Employee ID  Status
613850       Active

1. Termination/Retireme...  This is the instruction text placeholder

VIEW PAY         JOB        EMPLOYMENT
PERIOD DATES     HISTORY    DATES

Action *
TER - Termination ⌄

Effective Date *
9/2/2016

< BACK

Insights
Data from Q1 2016

1306

Top 10 Company Termination Reasons (Voluntary)

| | |
|---|---|
| 1. Dissatisfied with Manager | 15 |
| 2. Commute | 14 |
| 3. Career Change | 12 |
| 4. Relocation | 10 |
| 5. Dissatisfied with Promotion Opps | 3 |
| 6. Salary | 3 |
| 7. Work/Life Balance | 2 |
| 8. Coworker Relationship | 2 |
| 9. Unchallenged by Job | 1 |
| 10. Financial Stability of Company | 1 |

(?)  ▶  0 / 5  Comments

INFORMATION SYSTEM WITH EMBEDDED INSIGHTS

BACKGROUND INFORMATION

1. Field

The present disclosure relates generally to an improved computer system and, in particular, to a method and apparatus for accessing information in a computer system. Still more particularly, the present disclosure relates to a method and apparatus for presenting contextually relevant insights into information in a computer system.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to hire new employees, assign employees to projects, perform reviews for employees, and other suitable operations for the organization. As another example, a research department in the organization may use an information system to store and analyze information to research new products, analyze products, or for other suitable operations.

Currently used information systems include databases. These databases store information about the organization. For example, these databases store information about employees, products, research, product analysis, business plans, and other information about the organization.

Information about the employees may be searched and viewed to perform various operations within an organization. However, this type of information in currently used databases may be cumbersome and difficult to access relevant information in a timely manner that may be useful to performing an operation for the organization. For example, accessing relevant information to the operation being performed may be desirable for operations such as identifying new hires, selecting teams for projects, and other operations in the organization. However, because the relevant information cannot be accessed in context with the operation, relevant information is often excluded from the analysis and performance of the operation. Furthermore, retrieving information relevant to the operation from a database may take more time than desired in an information system.

Therefore, it would be desirable to have a method and apparatus that take into account at least some of the issues discussed above, as well as other possible issues. For example, it would be desirable to have a method and apparatus that overcome the technical problem of presenting contextually relevant insights into information.

SUMMARY

An embodiment of the present disclosure provides a method for displaying contextually relevant insights into human resources information. The method displays human resources information from a human resources profile of an employee of an organization. The human resources information is displayed within a context of an operation to be performed for the organization. The method identifies the human resources information within related information. The method determines whether the related information is relevant to the context of the operation to be performed. In response to determining that the related information is relevant to the context of the operation to be performed, the method generates an insight into the human resources information based on a data point for the human resources information within the related information. The method displays the insight with the human resources information within the context of the operation to be performed. Performing the operation is enabled using the insight displayed with the human resources information.

Another embodiment of the present disclosure provides a computer system comprising a display system and an insight processor in communication with the display system. The insight processor displays human resources information from a human resources profile of an employee of an organization. The human resources information is displayed within a context of an operation to be performed for the organization. The insight processor identifies the human resources information within related information. The method determines whether the related information is relevant to the context of the operation to be performed. In response to determining that the related information is relevant to the context of the operation to be performed, the insight processor generates an insight into the human resources information based on a data point for the human resources information within the related information. The insight processor displays the insight with the human resources information within the context of the operation to be performed. Performing the operation is enabled using the insight displayed with the human resources information.

Yet another embodiment of the present disclosure provides a computer program product for displaying contextually relevant insights into human resources information comprising a computer readable storage media, and first program code, second program code, third program code, fourth program code, and fifth program code stored on the computer readable storage media. The first program code displays human resources information from a human resources profile of an employee of an organization. The human resources information is displayed within a context of an operation to be performed for the organization. The second program code identifies the human resources information within related information. The third program code determines whether the related information is relevant to the context of the operation to be performed. In response to determining that the related information is relevant to the context of the operation to be performed, the fourth program code generates an insight into the human resources information based on a data point for the human resources information within the related information. The fifth program code displays the insight with the human resources information within the context of the operation to be performed. Performing the operation is enabled using the insight displayed with the human resources information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is an illustration of a graphical user interface for displaying relevant insights into human resources information depicted according to an illustrative embodiment;

FIG. 5 is an illustration of a user selection of a graphical control within a graphical user interface for displaying relevant insights depicted according to an illustrative embodiment;

FIG. 6 is an illustration of a graphical user interface displaying insights relevant to an organization operation for viewing employment profile depicted in according to an illustrative embodiment;

FIG. 7 is an illustration of a graphical user interface displaying a metric from which an insight can be extrapolated depicted according to an illustrative embodiment;

FIG. 9 is an illustration of a graphical user interface for displaying embedded insights into human resources information depicted according to an illustrative embodiment;

FIG. 12 is an illustration of a graphical user interface displaying insights relevant to an organization operation for viewing employment profile depicted in according to an illustrative embodiment;

FIG. 13 is an illustration of a comparison of information to organization benchmarks and industry benchmarks depicted according to an illustrative embodiment;

FIG. 14 is an illustration of a comparison of information to organization benchmarks and industry benchmarks depicted according to an illustrative embodiment;

DETAILED DESCRIPTION

The illustrative embodiments recognize and take into account one or more different considerations. For example, the illustrative embodiments recognize and take into account that an employer may need information about an employee when performing certain operations. The illustrative embodiments also recognize and take into account that searching information systems may be more cumbersome and time-consuming than desirable.

The illustrative embodiments also recognize and take into account that presenting insights relevant to information in context with information relating to the operation may facilitate the ease at which related information, such as skills, is accessed and relied upon to perform the operation. The illustrative embodiments also recognize and take into account that identifying insights relevant to a particular operation may still be more difficult than desired.

Thus, the illustrative embodiments provide a method and apparatus for displaying contextually relevant insights into human resources information. In one illustrative example, human resources information him is displayed from a human resources profile of an employee of an organization. The human resources information is displayed within a context of an operation to be performed for the organization. The human resources information is identified within related information. A determination is made as to whether the related information is relevant to the context of the operation to be performed. In response to determining that the related information is relevant to the context of the operation to be performed, an insight into the human resources information is generated based on a data point for the human resources information within the related information. The insight is displayed with the human resources information within the context of the operation to be performed. Performing the operation is enabled using the insight displayed with the human resources information.

Figure 1:
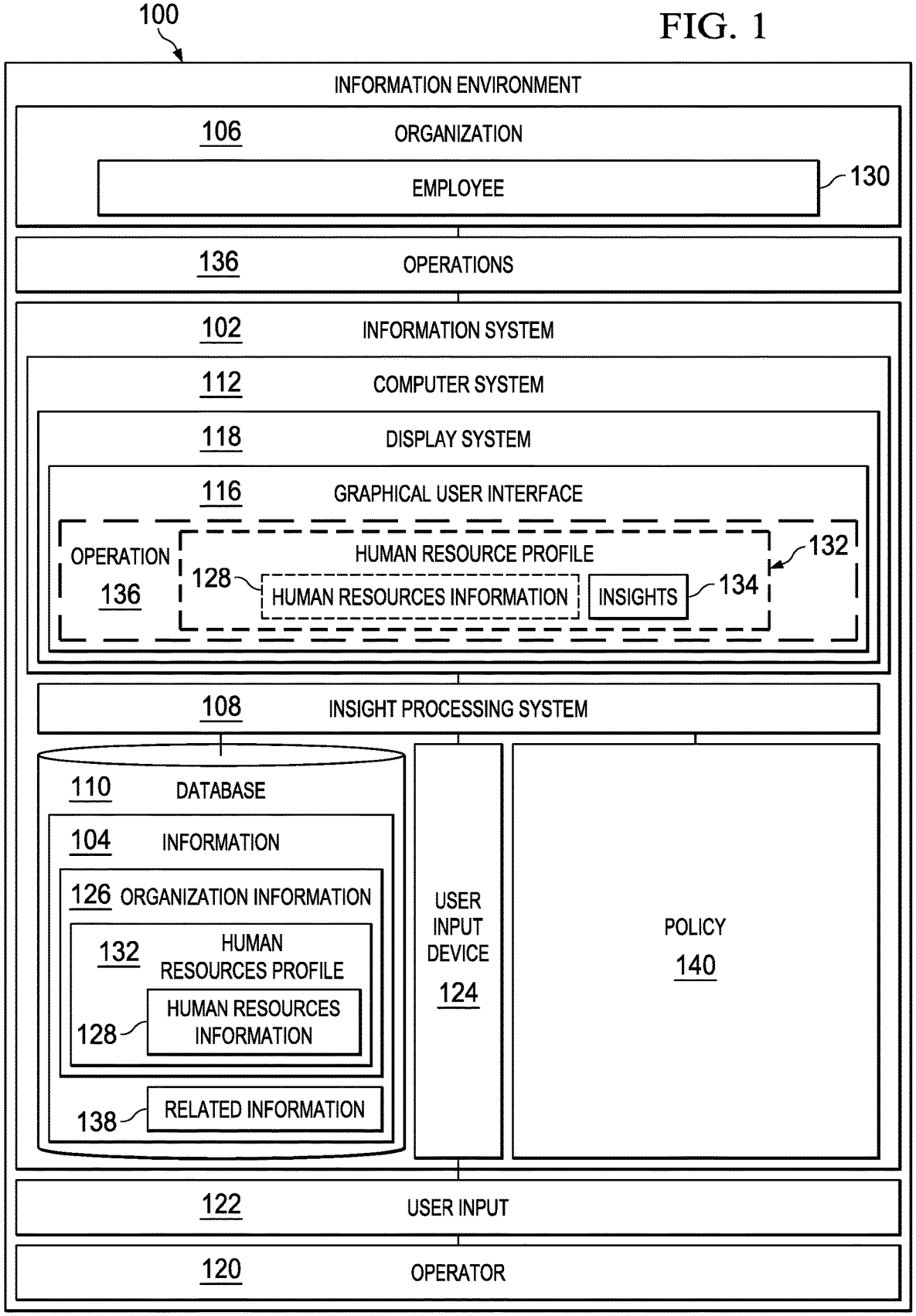
FIG. 1 is an illustration of a block diagram of an information environment depicted in accordance with an illustrative embodiment.

With reference now to the figures and, in particular, with reference to FIG. 1, an illustration of a block diagram of an information environment is depicted in accordance with an illustrative embodiment. In this illustrative example, information environment 100 includes information system 102. Information system 102 manages information 104 about organization 106.

Organization 106 may be, for example, a corporation, a partnership, a charitable organization, a city, a government agency, or some other suitable type of organization. Information 104 about organization 106 may include, for example, at least one of information about people, products, research, product analysis, business plans, financials, or other information relating to organization 106.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Information system 102 may take different forms. For example, information system 102 may be selected from one of an employee information system, a research information system, a sales information system, an accounting system, a payroll system, a human resources system, or some other type of information system that stores and provides access to information 104 about organization 106.

In this illustrative example, information system 102 includes different components. As depicted, information system 102 includes insight processing system 108 and database 110. Insight processing system 108 and database 110 may be implemented in computer system 112.

As depicted, insight processing system 108 provides access to information 104 using insights 134 that are displayed in graphical user interface 116 in display system 118 in computer system 112. The access may include at least one of reading, writing, modifying, or operating on information 104.

Insight processing system 108 may be implemented in software, hardware, firmware, or a combination thereof. When software is used, the operations performed by insight processing system 108 may be implemented in program code configured to run on hardware, such as a processor unit. When firmware is used, the operations performed by insight processing system 108 may be implemented in program code and data and stored in persistent memory to run on a processor unit. When hardware is employed, the hardware may include circuits that operate to perform the operations in insight processing system 108.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 112 is a physical hardware system and includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

As depicted, display system 118 is a physical hardware system and includes one or more display devices. The display devices may include at least one of a light emitting diode (LED) display, a liquid crystal display (LCD), an organic light emitting diode (OLED) display, or some other suitable display device.

As depicted, display system 118 includes one or more display devices on which graphical user interface 116 may be displayed. Operator 120 is a person who may interact with graphical user interface 116 through user input 122 generated by user input device 124 in computer system 112. User input device 124 may be, for example, a mouse, a keyboard, a trackball, a touchscreen, a stylus, or some other suitable type of input device.

In this illustrative example, information 104 includes organization information 126. Organization information 126 may include, for example, at least one of information about people, products, benefits, payroll, research, product analysis, business plans, financials, or some other information relating to organization 106. In one illustrative example, organization information 126 includes human resources information 128 for employee 130 of organization 106. In this illustrative example, human resources information 128 for employee 130 is stored in human resources profile 132.

In this illustrative example, insight processing system 108 generates insights 134 into human resources information 128. Insight processing system 108 displays insights 134 when insights 134 are contextually relevant to information 104 that is accessed in performing operation 136. As depicted, operation 136 is facilitated through the use of insights 134 displayed in context with, and that are relevant to, human resources information 128 on graphical user interface 116.

As used herein, insights 134 are inferences with regard to human resources information 128 extrapolated from related information 138. Insights 134 can be, for example, inferences regarding human resources information 128 in human resources profile 132 for employee 130. Insight 134 can be an inference regarding a current state of human resources information 128, based on information 104 that is relevant to human resources information 128 in the context of performing operation 136. Insight 134 can be an inference regarding a predicted change to the current state of human resources information 128, based on related information 138 that is relevant to human resources information 128 in the context of performing operation 136.

By displaying insights 134 relevant to human resources information 128 in context of operation 136, insight processing system 108 enables more efficient performance of operation 136 for organization 106. In this illustrative example, operation 136 is an operation performed for the benefit of organization 106. For example, operation 136 can be operations such as, but not limited to, at least one of hiring, benefits administration, payroll, performance reviews, forming teams for new products, assigning research projects, or other suitable operations for organization 106.

In this illustrative example, insight processing system 108 identifies related information 138 that is contextually relevant to human resources information 128 in the performance of operation 136 using policy 140. In this illustrative example, policy 140 includes a group of rules that are used to identify related information 138. In this illustrative example, policy 140 includes a group of rules that are used to determine when related information 138 is relevant to human resources information 128 within the context of operation 136. Policy 140 also may include data used to apply the one or more rules. As used herein, the "group of," when used with reference to items, means one or more items. For example, a "group of rules" is one or more rules.

Insight processing system 108 identifies related information 138 for human resources information 128 in the context of operation 136 from information 104. In this illustrative example, related information 138 may include one or more reports, metrics, or combinations thereof, that, in the context of operation 136, are identified as an underlying contributing factors to the current state of human resources information 128. Additionally, insight processing system 108 generates insights 134 for human resources information 128 based on related information 138 that meets policy 140 when related information 138 is relevant to human resources information 128 in the context of operation 136. When related information 138 is relevant to human resources information 128 in the context of operation 136, insights 134 generated therefrom may be relied upon to perform operation 136 for organization 106 in this illustrative example.

As depicted, the identification of related information 138 may be made by searching information 104. In an illustrative example, a search of information 104 may be performed for human resources information 128. In other illustrative examples, related information 138 may be identified in other ways. For example, related information 138 may be identified based an association between operation 136 and related information 138.

As depicted, insight processing system 108 identifies generates insights 134 for human resources information 128 operation 136 when related information 138 is identified as relevant to human resources information 128 in the context of operation 136. Related information 138 is identified as relevant to human resources information 128 in the context of operation 136 when information 104 meets policy 140.

As a result, more certainty is present in generating insights 134 based on an identification of related information 138 in the context of operation 136. In other words, related information 138 that is identified as relevant to human resources information 128 in the context of a first one of operation 136 may not be identified as relevant to human resources information 128 within the context of a second one of operation 136, if information 104 does not meet one or more rules in policy 140 for identifying whether related information 138 is relevant within the context of the second one of operation 136. In this manner, generating and displaying insights 134 into human resources information 128 is enabled based on related information 138 within the context of a particular one of operation 136.

The illustrative example in FIG. 1 and the examples in the other subsequent figures provide one or more technical solutions to overcome a technical problem of presenting contextually relevant insights that make identifying information relevant to the performance of operations for an organization more cumbersome and time-consuming than desired. For example, insight processing system 108 identifies and generates insights 134 for human resources information 128 in the context of operation 136 when related information 138 is identified as relevant to human resources information 128 within the context of operation 136. Related information 138 is identified as relevant to human resources information 128 within the context of operation 136 when related information 138 meets policy 140.

In this manner, the use of insight processing system 108 has a technical effect of reducing time, effort, or both in generating and displaying insights 134 into human resources information 128 in the context of operation 136. In this manner, operation 136 performed for organization 106 may be performed more efficiently as compared to currently used systems for displaying human resources information 128. For example, insights 134 may be used in operations selected from at least one of hiring, benefits administration, payroll, performance reviews, forming teams for new products, assigning research projects, or other suitable operations for organization 106.

As a result, computer system 112 operates as a special purpose computer system in which insight processing system 108 in computer system 112 enables generating and displaying insights 134 into human resources information 128 is enabled based on relevant information 138 in the context of operation 136 to be performed. For example, insight processing system 108 generates insights 134 for human resources information 128 based on relevant information 138 that meets policy 140 when information 138 is relevant information 138. When information 138 is relevant information 138, insights 134 generated therefrom may be relied upon to perform operation 136 for organization 106.

Thus, insight processing system 108 transforms computer system 112 into a special purpose computer system as compared to currently available general computer systems that do not have insight processing system 108. Currently used general computer systems do not reduce the time or effort needed to identify relevant information 138 that is relevant to human resources information 128 in the context of operation 136. Further, currently used general computer systems do not provide for identifying information 104 as relevant information 138 when information 104 meets policy 140.

Figure 2:
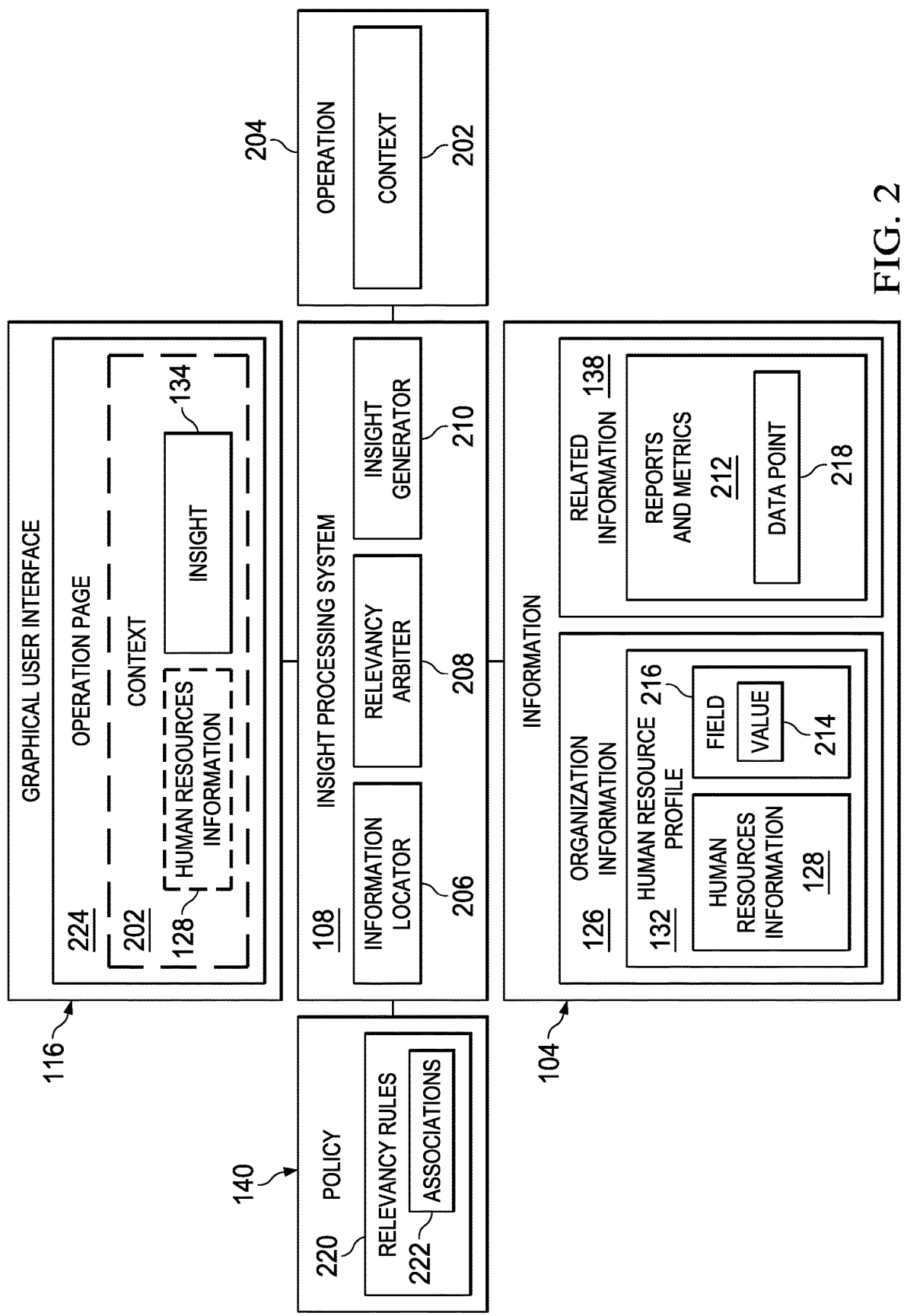
FIG. 2 is an illustration of a data flow for generating and displaying an insight into human resources information within the context of operation for organization depicted in accordance with an illustrative embodiment.

With reference next to FIG. 2, an illustration of a data flow for generating and displaying an insight into human resources information within the context of operation for organization is depicted in accordance with an illustrative embodiment. As depicted, insight processing system 108 displays insight 134 for human resources information 128 in context 202 of operation 204. Operation 204 is an example of one of operations 136, shown in block form in FIG. 1.

As depicted, insight processing system 108 includes a number of different components. As used herein, "a number of" means one or more different components. As depicted, insight processing system 108 includes information locator 206, relevancy arbiter 208, and insight generator 210.

As depicted, insight processing system 108 includes information locator 206. Information locator 206 identifies related information 138 from information 104 within context 202 of operation 204. In one illustrative example, information locator 206 is a search engine that searches information 104 for related information 138.

In this illustrative example, related information 138 includes reports and metrics 212. Reports and metrics 212 include reporting information within information 104, such as reports regarding operating data, financial data, and human resources data of organization 106, shown in block form in FIG. 1. Reports and metrics 212 include metrics information within information 104, such as metrics used to track, monitor and assess various business processes of organization 106.

In this illustrative example, information locator 206 identifies reports and metrics 212 that correspond to human resources information 128. For example, human resources information 128 may be stored as value 214 in field 216 of human resources profile 132. Information locator 206 searches information 104 for value 214. Information locator 206 identifies reports and metrics 212 as related information 138 when reports and metrics 212 includes data point 218 that corresponds to value 214.

As depicted, insight processing system 108 includes relevancy arbiter 208. Relevancy arbiter 208 determines when related information 138 identified by information locator 206 is relevant to human resources information 128 in context 202 of operation 204.

In this illustrative example, relevancy arbiter 208 determines that related information 138 is relevant to human resources information 128 in context 202 of operation 204 by applying one or more relevancy rules 220 of policy 140. In this illustrative example, relevancy rules 220 determine that related information 138 is relevant to human resources information 128 within context 202 based on associations 222.

Associations 222 are rules that associate related information 138 and context 202. In one illustrative example, each of associations 222 associates different reports and metrics 212 with at least one of an operation, a context of an operation. As depicted, Associations 222 associate reports and metrics 212 identified by information locator 206 with context 202 of operation 204.

As depicted, insight processing system 108 includes insight generator 210. In this illustrative example, insight generator 210 generate insight 134 for human resources information 128 based on related information 138 identified by relevancy arbiter 208 as relevant to context 202.

In this illustrative example, insight 134 is an inference with regard to human resources information 128. Insight generator 210 extrapolates insight 134 from related information 138 identified by relevancy arbiter 208 as relevant to context 202 of operation 136.

As depicted, graphical user interface 116 defines operation page 224. Operation page 224 is a digital document is that facilitates performing operation 204. In this illustrative example, operation page 224 defines context 202 of operation 204.

As a result, insight processing system 108 in enables generating and displaying insights 134 into human resources information 128 is enabled based on relevant information 138 in context 202 of operation 204. In this illustrative example, insight processing system 108 generates insights 134 for human resources information 128 based on related information 138. In this manner, insights 134 generated therefrom may be relied upon to perform operation 136 for organization 106.

Figure 3:
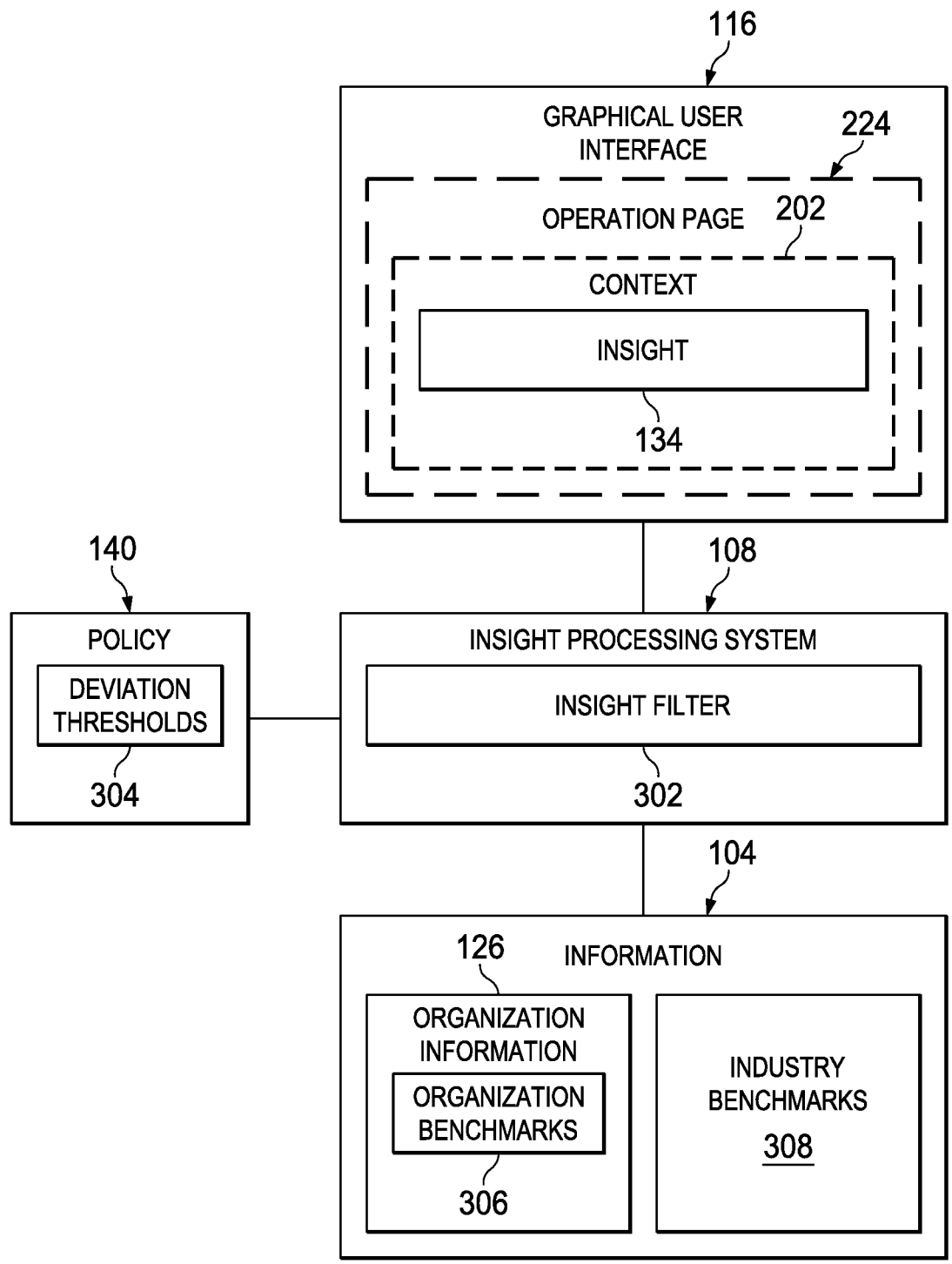
FIG. 3 is an illustration of a data flow for generating and displaying an insight into human resources information depicted in accordance with an illustrative embodiment.

With reference next to FIG. 3, an illustration of a data flow for generating and displaying an insight into human resources information is depicted in accordance with an illustrative embodiment. As depicted, insight processing system 108 displays insight 134 in context 202.

As depicted, insight processing system 108 includes insight filter 302. Insight filter 302 is a component of insight processing system 108 that selectively displays insight 134 based on application of deviation thresholds 304 of policy 140.

In this illustrative example, deviation thresholds 304 are rules associated with statistical variances defined by at least one of organization benchmarks 306 and industry benchmarks 308. Organization benchmarks 306 are standards or points of reference internal to organization 106, shown in block form in FIG. 1, against which insight 134 is compared. Similarly, industry benchmarks 308 are standards or points of reference external to organization 106 against which insight 134 is compared.

In this illustrative example, insight filter 302 compares insight 134 with at least one of organization benchmarks 306 and industry benchmarks 308 to determine whether insight 134 exceeds deviation threshold 304. When insight 134 exceeds deviation threshold 304, insight processing system 108 displays insight 134 on operation page 224 in context 202.

As a result, insight processing system 108 in enables generating and displaying insights 134 into human resources information 128 based on relevant information 138 in context 202 of operation 204. In this illustrative example, insight processing system 108 displays insight 134 based on deviation thresholds 304. In this manner, insights 134 that significantly deviate from benchmarks established by one of the organization or industry may be preferentially displayed and relied upon to perform operation 136 for organization 106. For example, insight processing system 108 enables displaying insight 134 only if insight 134 exceeds deviation thresholds 304 as defined by policy 140. For example, insight 134 is displayed in context 202 only when insight 134 meets one or more rules in policy 140 for deviation thresholds 304.

With reference to FIG. 4, an illustration of a graphical user interface for displaying relevant insights into human resources information is depicted according to an illustrative embodiment. In this illustrative example, graphical user interface 400 displays operation page 401. Operation page 401 is a page, such as operation page 224 of FIG. 2, for viewing employment profile 402 for employee 404 of organization 405. Graphical user interface 400 is an example of graphical user interface 116 of FIG. 1. Employment profile 402 is an example of human resources profile 132 of FIG. 1. Employee 404 is example of employee 130 of FIG. 1. Organization 405 is an example of organization 106 of FIG. 1.

In this illustrative example, employment profile 402 includes field 406, field 408, field 410, field 412, field 414, and field 416. Each of field 406, field 408, field 410, field 412, field 414, and field. 416 are examples of field 216, shown in block form in FIG. 2.

As depicted, field 406 corresponds to a position of employee 404 in organization 405. Field 406 corresponding to the position of employee 404 can include, for example but not limited to, a position identifier of employee 404, a position start date of employee 404, a job function of employee 404, a job change reason of employee 404, a job class of employee 404, Fair Labor Standards Act (FLSA) status of employee 404, North American Industry Classification System (NAICS) status of employee 404, Equal Employment Opportunity Commission (EEOC) classification of employee 404, officer/owner status of employee 404, management status of employee 404, pay grade of employee 404, company code of employee 404, and file number of employee 404.

As depicted, field 408 may correspond to a status of employee 404 in organization 405. Field 408 corresponding to the status of employee 404 can include, for example but not limited to, a hiring date of employee 404, a hiring reason of employee 404, a leave date of employee 404, a leave return date of employee 404, a rehire date of employee 404, and a rehire reason of employee 404.

As depicted, field 410 may correspond to a compensation of employee 404 in organization 405. In this illustrative example, field 410 corresponding to the compensation of employee 404 can include, for example but not limited to, an annual salary of employee 404, a premium rate factors of employee 404, FLSA overtime status of employee 404, cancel automatic pay of employee 404, and tipped employee of employee 404.

As depicted, field 412 may correspond to a corporate group of employee 404 in organization 405. In this illustrative example, field 412 corresponding to a corporate group of employee 404 can include, for example but not limited to, a business unit of a group to which employee 404 is assigned, a location of a group to which employee 404 is assigned, a home department of a group to which employee 404 is assigned, a union code of a group to which employee 404 is assigned, a home cost number of a group to which employee 404 is assigned, and a union local of a group to which employee 404 is assigned. In this illustrative example, "a group" may be, for example, at least one of teams, departments, divisions, or some other suitable type of organizational unit within organization 405 to which employee 404 is assigned or associated.

As depicted, field 414 may correspond to the employment status of employee 404 in organization 405. In this illustrative example, field 414 corresponding to the employment status of employee 404 can include, for example but not limited to, an employment type of employee 404, a seniority date of employee 404, an associate identifier of employee 404, a credited service date of employee 404, a hiring source of employee 404, an adjusted service date of employee 44, a national retirement date of employee 404, and an early retirement date of employee 404.

As depicted, field 416 may correspond to a work schedule of employee 404 in organization 405. In this illustrative example, field 416 corresponding to the work schedule of employee 404 can include, for example but not limited to, a Full Time Equivalent (FTE) of employee 404, an assigned shift of employee 404, a scheduled hours of employee 404, and an hours period of employee 404.

In this illustrative example, operation, page 401 includes graphical control 418. Graphical controls 418 are objects displayed in graphical user interface 400 that can be manipulated by an operator, such as operator 120 of FIG. 1, to display insights relevant to the operation of viewing employment profile 402 for employee 404.

In this illustrative example, graphical control 418 is a round button. However, graphical control 418 may take the form of other graphical controls, such as, for example, but not limited to, at least one of round buttons, arrow buttons, entry fields, or other suitable types of controls for displaying insights relevant to the operation of viewing employment profile 402 for employee 404.

Figure 5:
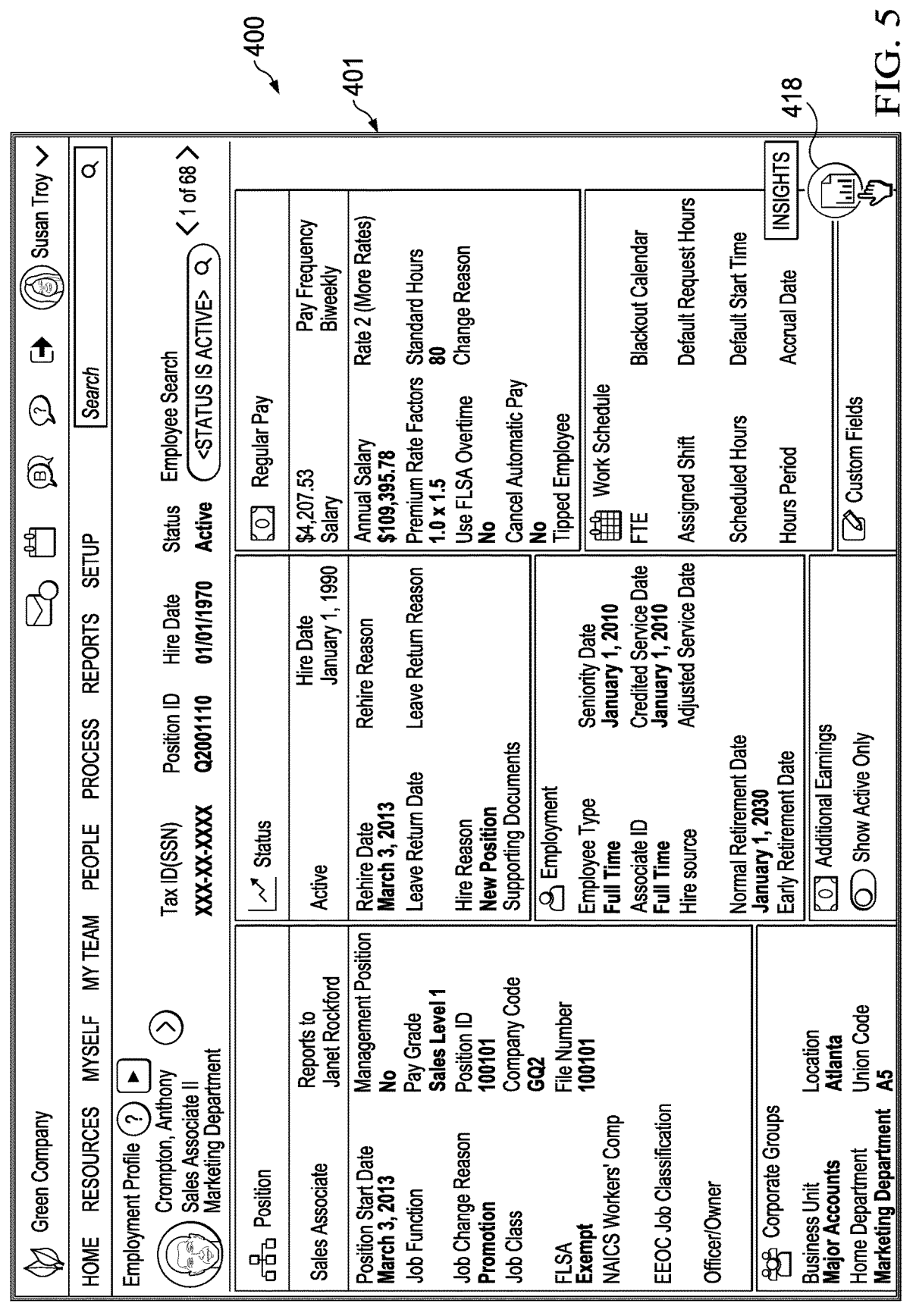

With reference now to FIG. 5, an illustration of a user selection of a graphical control within a graphical user interface for displaying relevant insights is depicted according to an illustrative embodiment. In this illustrative example, a selection of graphical control 418 from operation page 401 as displayed on graphical user interface 400 is illustrated.

As depicted, and operator, such as operator 120 of FIG. 1, moves pointer 502 with an graphical user interface 400 to select graphical control 418. The selection of graphical control 418 is an example of user input 122, depicted in block form in FIG. 1. Pointer 502 can be moved using one or more user input devices, such as user input device 124 depicted in block form in FIG. 1.

With reference now to FIG. 6, an illustration of a graphical user interface displaying insights relevant to an organization operation for viewing employment profile is depicted in according to an illustrative embodiment. As depicted, related insights 600 are displayed within graphical user interface 400 in response to the selection of graphical control 418, as shown in FIG. 5.

As depicted, related insights 600 include insight 602, insight 604, and insight 606. Insights 600 also includes employment profile 402, which provides a context, such as context 202 of FIG. 2, for related insights 600.

As depicted, insight 602 is related information, such as related information 138 of FIG. 1, for a metric, such as one of reports and metrics 212 of FIG. 2. As depicted, insight 602 is a metric of information related to employment status 414 of employee 404, both shown in FIG. 4. As depicted, insight 602 is a metric illustrating hours worked by employees of organization 405 of FIG. 4.

In this illustrative example, insight 602 may act as a graphical control. In response to user input, such as user input 122 of FIG. 1, selecting insight 602, the underlying metric from which insight 602 is extrapolated can be displayed on graphical user interface 400.

In this illustrative example, insight 604 is related information, such as related information 138 of FIG. 1, for a report, such as one of reports and metrics 212 of FIG. 2. As depicted, insight 604 is a report of information related to position 406, shown in FIG. 4, of employee 404. As depicted, insight 604 is a report showing terminations of employees of organization 405 according to a manager of the employee.

In this illustrative example, insight 604 may act as a graphical control. In response to user input, such as user input 122 of FIG. 1, selecting insight 604, the underlying report from which insight 604 is extrapolated can be displayed on graphical user interface 400, as illustrated in FIG. 7 below.

In this illustrative example, insight 606 is related information, such as related information 138 of FIG. 1, for a metric, such as one of reports and metrics 212 of FIG. 2. As depicted, insight 606 is a metric of information related to a corporate group 412, shown in FIG. 4, of employee 404. As depicted, insight 606 is a metric illustrating a headcount of employees within a corporate group of organization 405 to which employee 404 is assigned or associated with.

In this illustrative example, insight 606 may act as a graphical control. In response to user input, such as user input 122 of FIG. 1, selecting insight 606, the underlying metric from which insight 606 is extrapolated can be displayed on graphical user interface 400, as illustrated in FIG. 8 below.

With reference now to FIG. 7, an illustration of a graphical user interface displaying a metric from which an insight can be extrapolated is depicted according to an illustrative embodiment. As depicted, metric 700 is a metric displayed on graphical user interface 400 in response to user input selecting of insight 604 of FIG. 6.

In this illustrative example, metric 700 is a metric showing terminations of employees of organization 405 according to a manager of the employee. Metric 700 is identified as related information, such as related information 138, when a manager of employee 404 is identified as a data point, such as data point 218 of FIG. 2, within metric 700.

Figure 8:
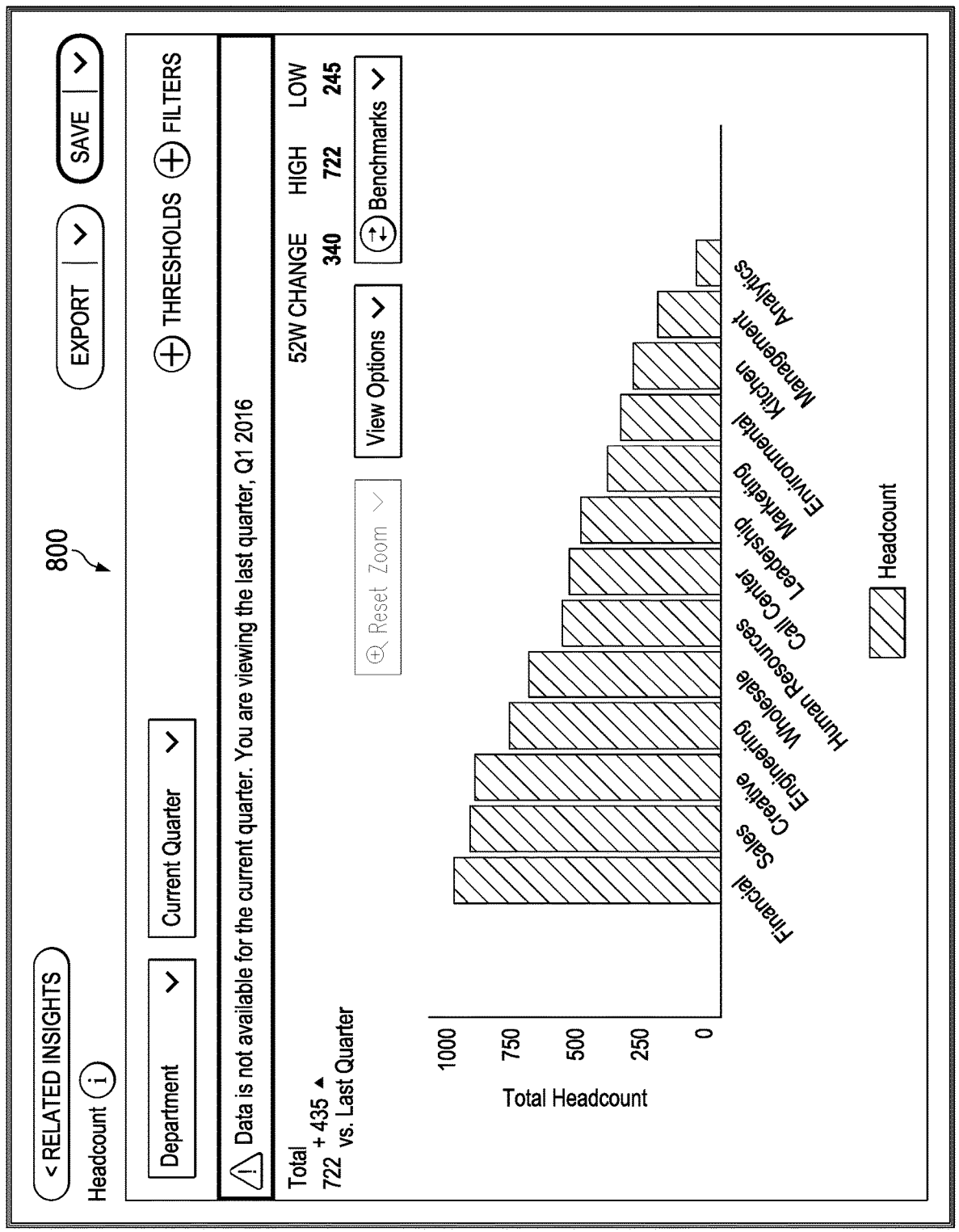
FIG. 8 is an illustration of a graphical user interface displaying a report from which an insight can be extrapolated depicted according to an illustrative embodiment.

With reference now to FIG. 8, an illustration of a graphical user interface displaying a report from which an insight can be extrapolated is depicted according to an illustrative embodiment. As depicted, report 800 is a metric displayed on graphical user interface 400 in response to user input selecting of insight 606 of FIG. 6.

In this illustrative example, report 800 is a metric for a headcount of employees within a corporate group of organization 405 to which employee 404 is assigned or associated with. Report 800 is identified as related information, such as related information 138, when employee 404 is identified as a data point, such as data point 218 of FIG. 2, within report 800.

With reference to FIG. 9, an illustration of a graphical user interface for displaying embedded insights into human resources information is depicted according to an illustrative embodiment. In this illustrative example, insight 902 is displayed with employment profile 402 on graphical user interface 400 in context of operation page 401.

As depicted, insight 902 is an insight, such as insight 134 of FIG. 1. In this illustrative example, Insight 902 is an inference regarding a predicted change to a state of information, such as human resources information 128 of FIG. 1, in employment profile 402. In this illustrative example, insight 902 is a conclusion based on a comparison of information in employment profile 402 to at least one of organization benchmarks, such as organization benchmarks 306 of FIG. 3, and industry benchmarks, such as industry benchmarks 308 of FIG. 3.

In this illustrative example, insight 902 may act as a graphical control. In response to user input, such as user input 122 of FIG. 1, selecting insight 902, the underlying comparison to organization benchmarks and industry benchmarks can be displayed on graphical user interface 400, as illustrated in FIG. 10 below.

Figure 10:
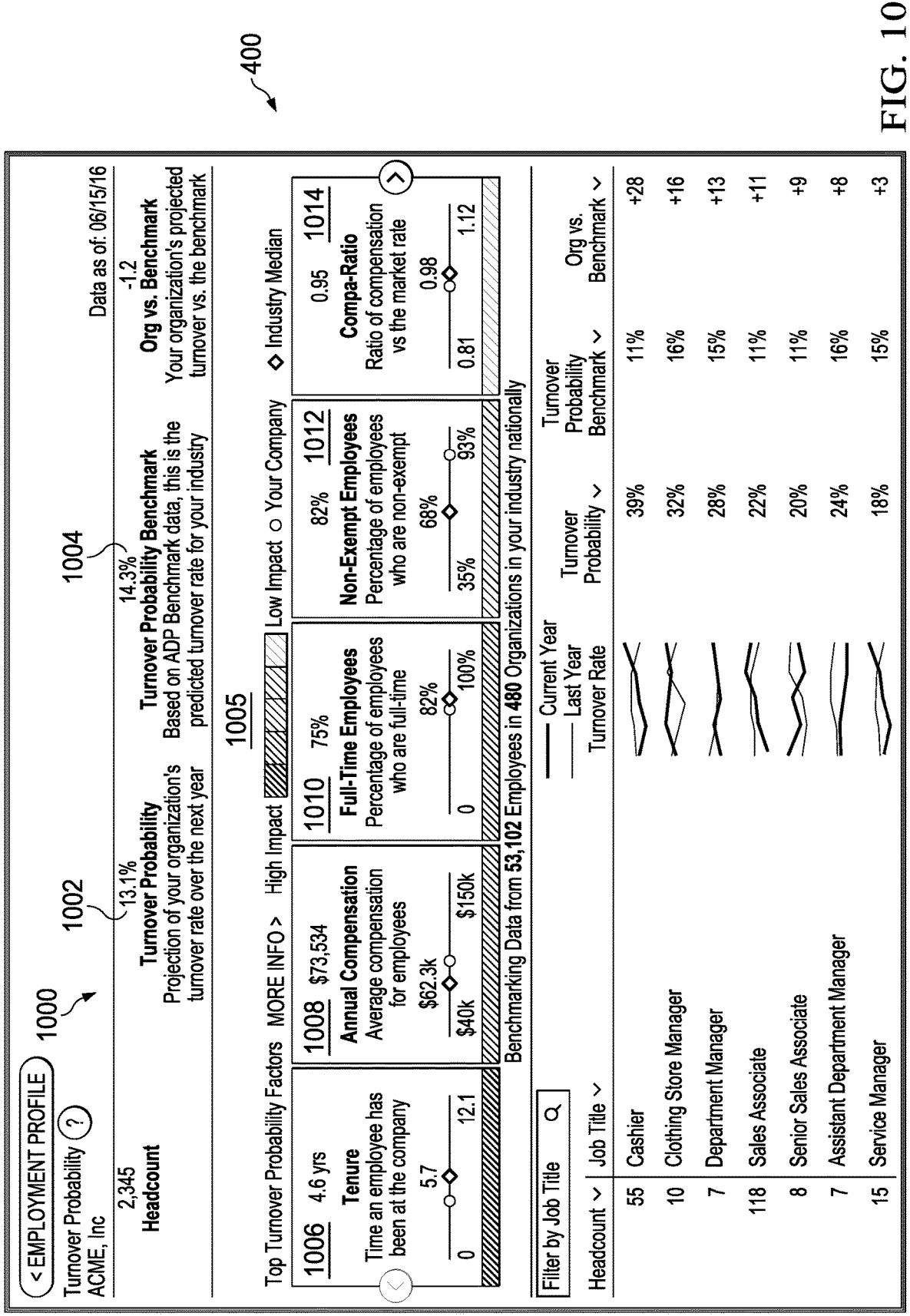
FIG. 10 is an illustration of a comparison of information in an employment profile to organization benchmarks and industry benchmarks depicted according to an illustrative embodiment.

With reference now to FIG. 10, an illustration of a comparison of information in an employment profile to organization benchmarks and industry benchmarks is depicted according to an illustrative embodiment. As depicted, comparison 1000 is comparison from which insight 902 of FIG. 9 is extrapolated. Comparison 1000 is displayed on graphical user interface 400 in response to user input selecting of insight 902 of FIG. 9.

In this illustrative example, comparison 1000 includes organization benchmark 1002 and industry benchmark 1004. Organization benchmark 1002 is a standard point of reference internal to organization 405 against which insight 902 is compared, such as organization benchmark 306 of FIG. 3. Industry benchmark 1004 is a standard point of reference to external to organization 405 against which insight 902 is compared, such as industry benchmark 308 of FIG. 3.

As depicted, comparison 1000 includes related information 1005. Related information 1005 may be related information 138 of FIG. 1. In this illustrative example, related information 1005 includes contributing factor 1006, contributing factor 1008 contributing factor 1010, contributing factor 1012, and contributing factor 1014. In the context of viewing employment profile 402, each of contributing factor 1006, contributing factor 1008 contributing factor 1010, contributing factor 1012, and contributing factor 1014 is a report, metric, or combinations thereof, that is identified as an underlying contributing factor to insight 902.

As depicted, comparison 1000 includes contributing factor 1006. In this illustrative example, contributing factor 1006 is a comparison of the tenure of employee 404 at organization 405 with an industry median tenure for employees in other organizations having human resources information similar to information in employment profile 402 for employee 404.

As depicted, comparison 1000 includes contributing factor 1008. In this illustrative example, contributing factor 1008 is a comparison of the annual compensation of employee 404 at organization 405 with an industry median annual compensation for employees in other organizations having human resources information similar to information in employment profile 402 for employee 404.

As depicted, comparison 1000 includes contributing factor 1010. In this illustrative example, contributing factor 1010 is a comparison of the number of full-time employees at organization 405 with an industry median for employees in other organizations.

As depicted, comparison 1000 includes contributing factor 1012. In this illustrative example, contributing factor 1012 is a comparison of the number of nonexempt employees at organization 405 with an industry median for employees in other organizations.

As depicted, comparison 1000 includes contributing factor 1014. In this illustrative example, contributing factor 1014 is a ratio of compensation of employee 404 at organization 405 to an industry median compensation for employees in other organizations having human resources information similar to information in employment profile 402 for employee 404.

In this illustrative example, each of contributing factor 1006, contributing factor 1008 contributing factor 1010, contributing factor 1012, and contributing factor 1014 is associated with a status of employee 404 in the context of viewing employment profile 402. The associations may be based on one or more rules for determining whether contributing factor 1006, contributing factor 1008 contributing factor 1010, contributing factor 1012, and contributing factor 1014 are relevant to a status of employee 404 in the context of viewing employment profile 402. The rules can be relevancy rules 220 of policy 140 shown in FIG. 2.

Figure 11:
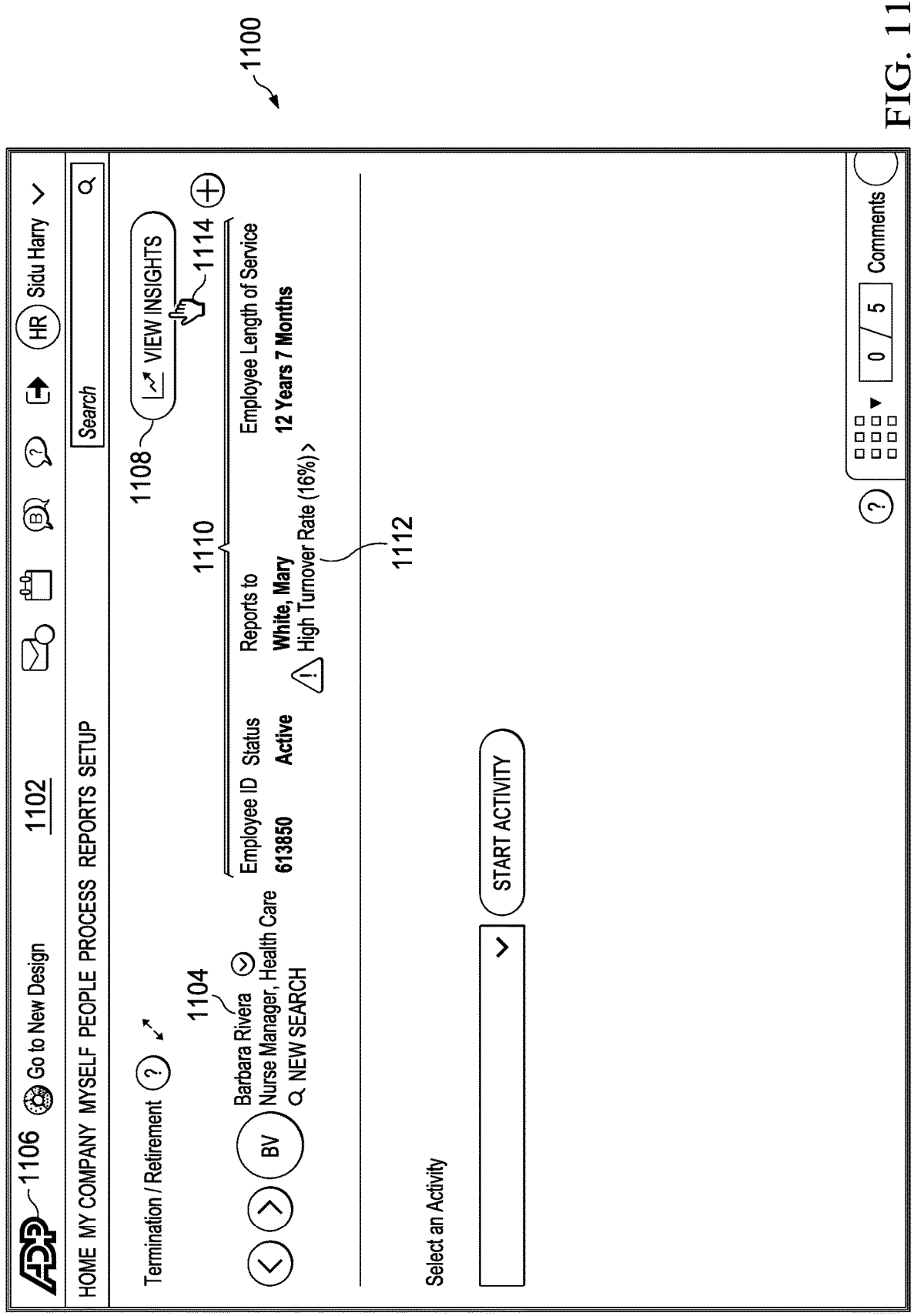
FIG. 11 is an illustration of a graphical user interface for displaying relevant insights into human resources information in the context of a second operation depicted according to an illustrative embodiment.

With reference to FIG. 11, an illustration of a graphical user interface for displaying relevant insights into human resources information in the context of a second operation is depicted according to an illustrative embodiment. In this illustrative example, graphical user interface 1100 displays operation page 1102. Operation page 1102 is a page, such as operation page 224 of FIG. 2, for processing a termination of employee 1104 of organization 1106. Graphical user interface 1100 is an example of graphical user interface 116 of FIG. 1. Employee 1104 is example of employee 130 of FIG. 1. Organization 1106 is an example of organization 106 of FIG. 1.

Figure 12:
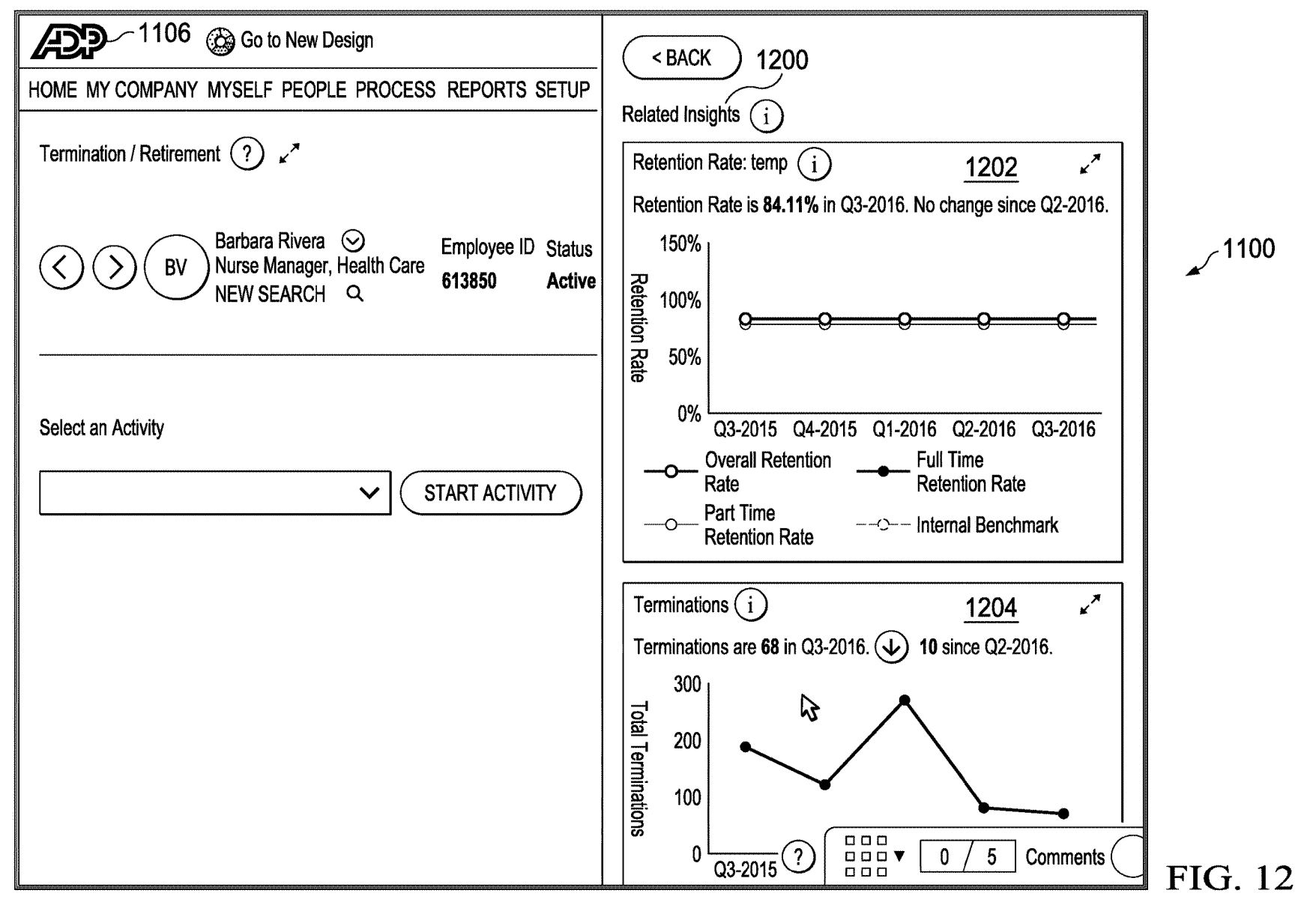

In this illustrative example, human resources information, such as human resources information 128 of FIG. 1, for employee 1104 is shown in context with the operation for organization 1106 of processing a termination of employee 1104. In this illustrative example, operation page 1102 includes graphical control 1108. Graphical controls 1108 are objects displayed in graphical user interface 1100 that can be manipulated by an operator, such as operator 120 of FIG. 1, to display insights relevant to the operation of processing a termination of employee 1104, as illustrated in FIG. 12 below.

In this illustrative example, graphical control 1108 is a round button. However, graphical control 1108 may take the form of other graphical controls, such as, for example, but not limited to, at least one of round buttons, arrow buttons, entry fields, or other suitable types of controls for displaying insights relevant to the operation of processing a termination of employee 1104.

In this illustrative example, human resources information 1110 is displayed with insight 1112 on graphical user interface 1100 in context of operation page 1102. As depicted, insight 1112 is an insight, such as insight 134 of FIG. 1. In this illustrative example, Insight 1112 is an inference regarding human resources information 1110 in the context of processing a termination of employee 1104. In this illustrative example, Insight 1112 is information regarding a possible contributing factor in the context of processing a termination of employee 1104.

In this illustrative example, insight 1112 may act as a graphical control. In response to user input, such as user input 122 of FIG. 1, selecting insight 1112, related information used by insight processing system 108, shown in block form in of FIG. 1, to extrapolate insight 1112 can be displayed on graphical user interface 400, as illustrated in FIG. 13 below.

As depicted, an operator, such as operator 120 of FIG. 1, moves pointer 1114 within graphical user interface 1100 to select graphical control 1108. The selection of graphical control 1108 is an example of user input 122, depicted in block form in FIG. 1. Pointer 1114 can be moved using one or more user input devices, such as user input device 124 depicted in block form in FIG. 1.

With reference now to FIG. 12, an illustration of a graphical user interface displaying insights relevant to an organization operation for viewing employment profile is depicted in according to an illustrative embodiment. As depicted, insights 1200 are displayed within graphical user interface 1100 in response to the selection of graphical control 1108, as shown in FIG. 11. As depicted, related insights 1200 include insight 1202 and insight 1204.

As depicted, insight 1202 is related information, such as related information 138 of FIG. 1, for a metric, such as one of reports and metrics 212 of FIG. 2. As depicted, insight 1202 is a metric of information related to a retention rate of employees of organization 1106.

In this illustrative example, insight 1202 may act as a graphical control. In response to user input, such as user input 122 of FIG. 1, selecting insight 1202, the underlying metric from which insight on 202 is extrapolated can be displayed on graphical user interface 1100.

As depicted, insight 1204 is related information, such as related information 138 of FIG. 1, for a metric, such as one of reports and metrics 212 of FIG. 2. As depicted, insight 1204 is a metric of information related to terminations of employees by organization 1106.

In this illustrative example, insight 1204 may act as a graphical control. In response to user input, such as user input 122 of FIG. 1, selecting insight 1204, the underlying report from which insight 1204 is extrapolated can be displayed on graphical user interface 1100.

With reference now to FIGS. 13 and 14, an illustration of a comparison of information to organization benchmarks and industry benchmarks is depicted according to an illustrative embodiment. As depicted, comparison 1300 is comparison from which insight 1112 of FIG. 11 is extrapolated. Comparison 1300 is displayed on graphical user interface 1100 in response to user input selecting of insight 1112 of FIG. 11.

In this illustrative example, comparison 1000 includes organization benchmark 1302. Organization benchmark 1302 is a standard point of reference internal to organization 1106 against which insight 1112 is compared, such as organization benchmark 306 of FIG. 3. As depicted, organization benchmark 1302 is a benchmark turnover rate for organization 1106.

As depicted, comparison 1300 includes contributing factor 1304 and contributing factor 1306. In the context of processing the termination of employee 1104, each of contributing factor 1304 and 1306 is a report, metric, or combinations thereof, that is identified as an underlying contributing factor to insight 1112.

As depicted, comparison 1300 includes contributing factor 1304. In this illustrative example, contributing factor 1304 is a comparison of employee 1104 at organization 1106 with other employees in organization 1106 whose employee profiles include human resources information 1110.

As depicted, comparison 1300 includes contributing factor 1306. In this illustrative example, contributing factor 1306 is a comparison of reasons given by employee 1104 in the context of a termination with other reasons given by former employees in organization 1106 whose employee profiles include human resources information 1110.

FIGS. 4-14 are illustrative examples of a graphical user interface that may be used to analyze skills for a group of people. The illustrations of the graphical user interfaces in FIGS. 4-14 are only presented as examples and are not meant to limit the manner in which graphical user interface 116 shown in block form in FIG. 1 may be implemented.

Figure 15:
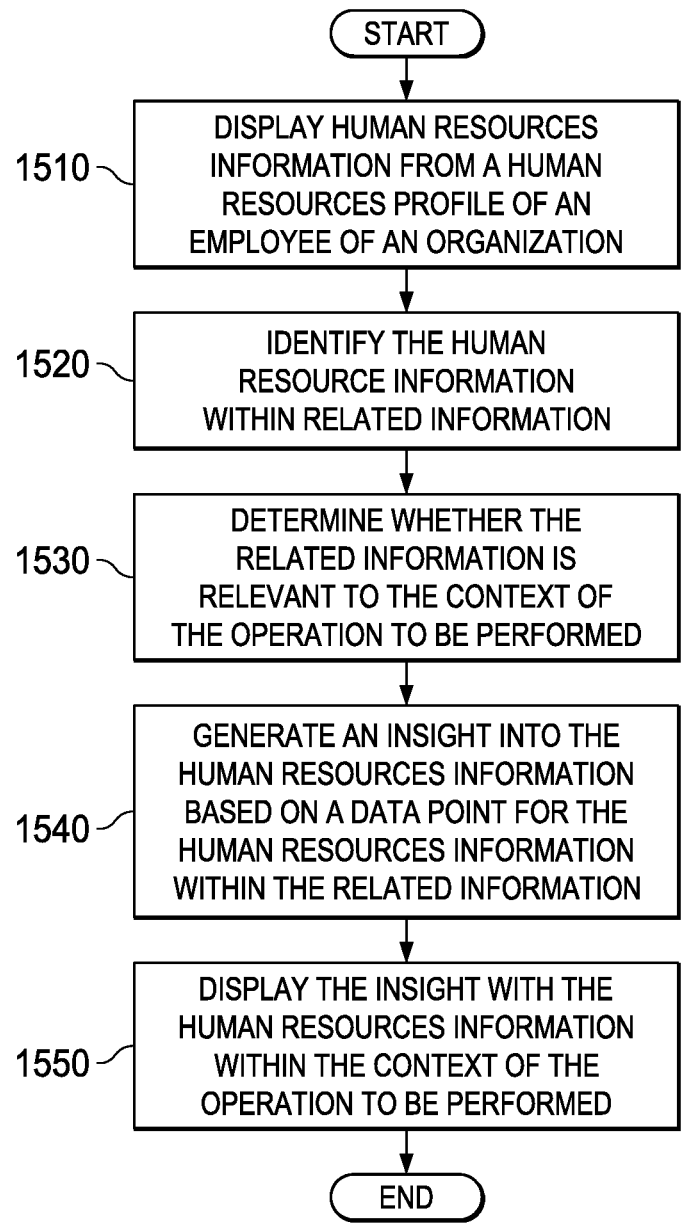
FIG. 15 is an illustration of a flowchart of a process for displaying contextually relevant insights into human resources information depicted in accordance with an illustrative embodiment.

Turning next to FIG. 15, an illustration of a flowchart of a process for displaying contextually relevant insights into human resources information is depicted in accordance with an illustrative embodiment. The process illustrated in FIG. 15 may be implemented in information environment 100 in FIG. 1. For example, the process may be implemented as operations performed by insight processing system 108 in FIG. 1.

The process 1500 begins by displaying human resources information from a human resources profile of an employee of an organization (step 1510). The human resources information is displayed within a context of an operation to be performed for the organization, such as operation 136 of FIG. 1. The human resources information can be, for example, human resources information 128 in human resources profile of FIG. 1.

Next, process 1500 identifies the human resources information within related information (step 1520). The related information can be reports and metrics 212 of FIG. 2 that include data point 218 corresponding to human resources information 128.

Process 1500 then determines whether the related information is relevant to the context of the operation to be performed (step 1530). In one illustrative example, process 1500 determines whether related information is relevant by applying one or more relevancy rules 220 of policy 140, both shown in FIG. 2.

In response to determining that the related information is relevant to the context of the operation to be performed, process 1500 generates an insight into the human resources information based on a data point for the human resources information within the related information (step 1540). The insight can be, for example, insight 134 of FIG. 2. The data point can be data point 218 of FIG. 2.

Process 1500 then displays the insight with the human resources information within the context of the operation to be performed (step 1550), with the process terminating thereafter. In this manner, performing the operation is enabled using the insight displayed with the human resources information.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
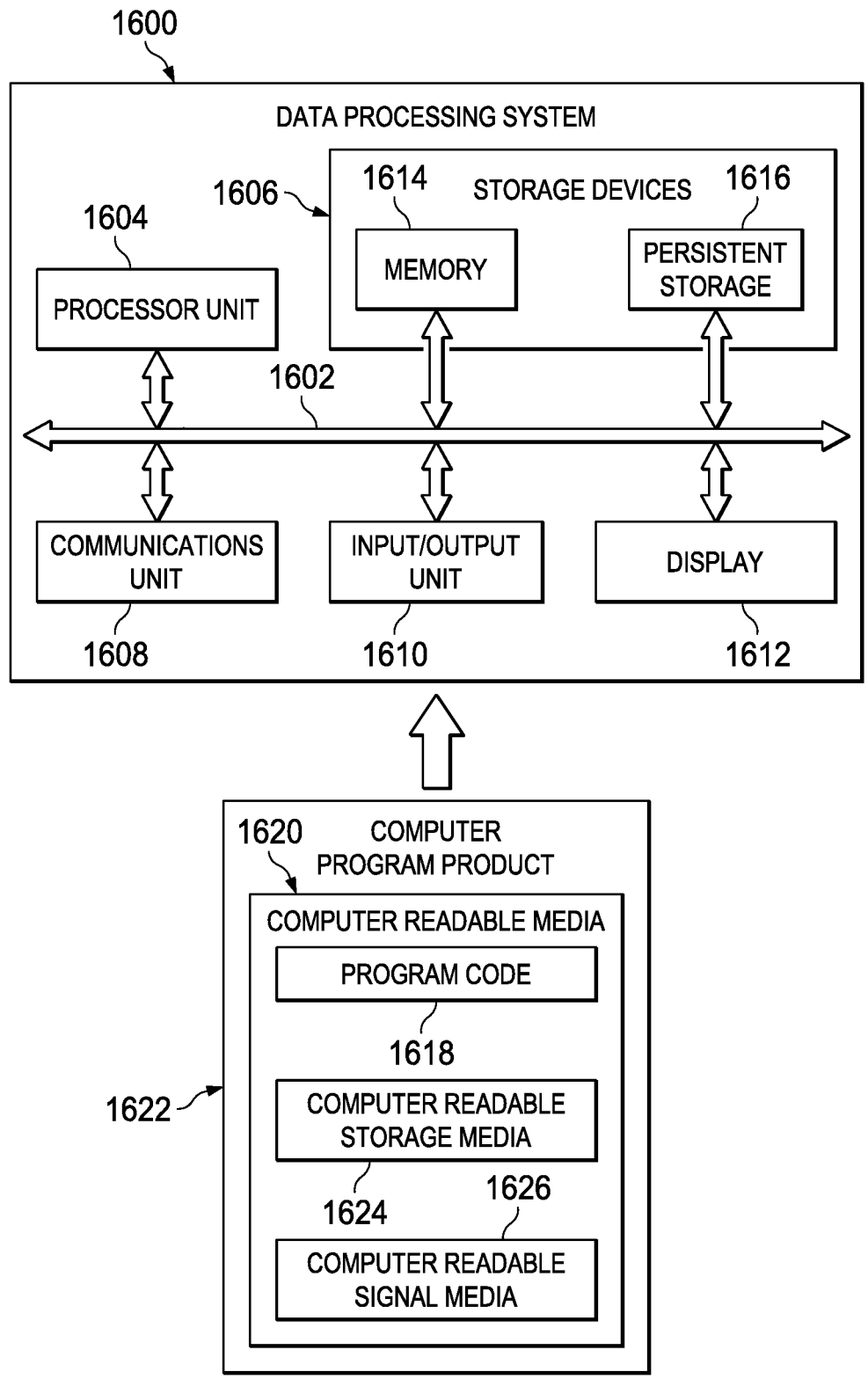
FIG. 16 is an illustration of a block diagram of a data processing system depicted in accordance with an illustrative embodiment.

Turning now to FIG. 16, an illustration of a block diagram of a data processing system is depicted in accordance with an illustrative embodiment. Data processing system 1600 may be used to implement one or more computers and computer system 112 in FIG. 1. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 may take the form of a bus system.

Processor unit 1604 serves to execute instructions for software that may be loaded into memory 1606. Processor unit 1604 may be a number of processors, a multi-processor core, or some other type of processor, depending on the particular implementation.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer readable storage devices in these illustrative examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that may be connected to data processing system 1600. For example, input/output unit 1612 may provide a connection for user input through at least of a keyboard, a mouse, or some other suitable input device. Further, input/output unit 1612 may send output to a printer. Display 1614 provides a mechanism to display information to a user.

Instructions for at least one of the operating system, applications, or programs may be located in storage devices 1616, which are in communication with processor unit 1604 through communications framework 1602. The processes of the different embodiments may be performed by processor unit 1604 using computer-implemented instructions, which may be located in a memory, such as memory 1606.

These instructions are referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these illustrative examples. In one example, computer readable media 1620 may be computer readable storage media 1624 or computer readable signal media 1626.

In these illustrative examples, computer readable storage media 1624 is a physical or tangible storage device used to store program code 1618 rather than a medium that propagates or transmits program code 1618. Alternatively, program code 1618 may be transferred to data processing system 1600 using computer readable signal media 1626.

Computer readable signal media 1626 may be, for example, a propagated data signal containing program code 1618. For example, computer readable signal media 1626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code 1618.

Thus, the illustrative embodiments provide a method and apparatus for analyzing skills. For example, insight processing system 108 in FIG. 1 provides a visualization of skills for people in an organization. This visualization is displayed in the form of a radar chart, a graphical user interface and a display system. The radar chart shows skills for people in the organization. In this manner, the skills are displayed in a manner that an operator viewing the radar chart is able to visualize the in skills for the people.

Further, insight processing system 108 provides an analysis in which the balance of skills is identified for the skills displayed for people in the radar chart. This balance of skills provides a visualization of strengths and weaknesses in skills for people displayed in the radar chart. Additionally, this balance skills may be used to identify a person with skills needed to fill a position, identify skills that may need improvement, and other suitable operations.

Thus, the illustrative examples provide one or more one or more technical solutions to overcome a technical problem of presenting contextually relevant insights. The use of insight processing system 108 has a technical effect of reducing time, effort, or both in generating and displaying insights 134 into human resources information 128 in the context of operation 136. In this manner, operations 136 performed for organization 106 may be performed more efficiently as compared to currently used systems for displaying human resources information 128. For example, insights 134 may be used in operations selected from at least one of hiring, benefits administration, payroll, performance reviews, forming teams for new products, assigning research projects, or other suitable operations for organization 106.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
a computer system including a hardware processor, a database including information and a display system in communication with the hardware processor, the display system including a graphical user interface, determining and displaying contextually relevant insights into human resources information by:
displaying, using the graphical user interface of the display system, human resources information from a human resources profile of an employee of an organization, wherein the human resources information is displayed within a context of an operation to be performed for the organization;
identifying, using the hardware processor, related information in the information of the database;
determining, using the hardware processor, whether the related information is relevant to the context of the operation to be performed;
responsive to determining that the related information is relevant to the context of the operation to be performed, generating, using the hardware processor, an insight into the human resources information based on a data point for the human resources information within the related information;
displaying, using the graphical user interface of the display system, the insight with the human resources information within the context of the operation to be performed, wherein performing the operation is enabled using the insight displayed with the human resources information;
responsive to generating the insight into the human resources information, comparing the insight to a set of benchmarks, using the hardware processor;
determining, using the hardware processor, whether the insight exceeds a set of deviation thresholds for the set of benchmarks, wherein the set of deviation thresholds are rules associated with statistical variances defined by at least one of a set of organization benchmarks that are standards or points of reference internal to the organization against which the insight is compared and industry benchmarks that are standards or points of reference external to the organization against which the insight is compared; and
when the insight exceeds the set of deviation thresholds for the set of benchmarks automatically performing, using the hardware processor, the operation for the organization,
wherein the insight further comprises a graphical control that is displayed by the graphical user interface of the display system of the computer system,
wherein selection of the graphical control displays, by the graphical user interface, reports and metrics from the related information that are relevant to the context of the operation to be performed.

2. The method of claim 1, further comprising:
displaying the human resources information within the context of the operation to be performed, wherein the human resources information comprises at least one of:
information related to a position of the employee within the organization;
information related to a status of the employee within the organization;
information related to a compensation of the employee by organization;
information related to a group of the organization to which the employee is assigned;
information related to an employment of the employee within the organization; or
information related to a work schedule of the employee at the organization.

3. The method of claim 1, wherein the context of the operation to be performed comprises at least one of hiring operations, benefits administration operations, payroll operations, performance review operations, operations for forming teams for new products, operations for assigning research projects.

4. The method of claim 1, wherein displaying the insight further comprises:
displaying the insight with the human resources information in response to determining that the insight exceeds the set of deviation thresholds for the set of benchmarks.

5. The method of claim 4, wherein the set of benchmarks is selected from the group consisting of organization benchmarks, industry benchmarks, and combinations thereof.

6. The method of claim 1, wherein determining whether the related information is relevant to the context of the operation to be performed further comprises:
identifying an association between the reports and metrics from the related information and both the operation and the context of the operation to be performed and
wherein the reports and metrics from the related information comprise a member selected from the group consisting of underlying contributing factors, related insights, underlying reports and combination thereof.

7. A computer system comprising:
a hardware processor;
a database including information; and
a display system in communication with the hardware processor, the display system including a graphical user interface;
wherein the hardware processor executes a software implementation of an insight processing system, the insight processing system comprising a human resources information locator, a relevancy arbiter, and an insight generator, wherein the insight processing system is configured to:
locate, with the human resources information locator, human resources information from a human resources profile of an employee of an organization;
display, with the graphical user interface of the display system, the human resources information in a context of an operation to be performed for the organization;
identify, with the insight processing system, related information in the information of the database;
determine, with the relevancy arbiter, whether the related information is relevant to the context of the operation to be performed;
in response to determining that the related information is relevant to the context of the operation to be performed, generate, with the insight generator, an insight into the human resources information based on a data point within the related information;

display, with the graphical user interface of the display system, the insight with the human resources information within the context of the operation to be performed, wherein performing the operation is enabled using the insight displayed with the human resources information;

responsive to generating the insight into the human resources information, compare, with the insight processing system, the insight to a set of benchmarks;

determine, with the insight processing system, whether the insight exceeds a set of deviation thresholds for the set of benchmarks, wherein the set of deviation thresholds are rules associated with statistical variances defined by at least one of a set of organization benchmarks that are standards or points of reference internal to the organization against which the insight is compared and industry benchmarks that are standards or points of reference external to the organization against which the insight is compared; and when the insight exceeds the set of deviation thresholds for the set of benchmarks automatically perform, with the hardware processor, the operation for the organization, wherein the insight further comprises a graphical control that is displayed by the graphical user interface of the display system of the computer system, wherein selection of the graphical control displays, by the graphical user interface, reports and metrics from the related information that are relevant to the context of the operation to be performed.

8. The computer system of claim 7, wherein the insight processing system is further configured:

to display the human resources information within the context of the operation to be performed, wherein the human resources information comprises at least one of:
information related to a position of the employee within the organization;
information related to a status of the employee within the organization;
information related to a compensation of the employee by organization;
information related to a group of the organization to which the employee is assigned;
information related to an employment of the employee within the organization; or
information related to a work schedule of the employee at the organization.

9. The computer system of claim 7, wherein the context of the operation to be performed comprises at least one of hiring operations, benefits administration operations, payroll operations, performance review operations, operations for forming teams for new products, or operations for assigning research projects.

10. The computer system of claim 7, wherein displaying the insight further comprises:
displaying the insight with the human resources information in response to determining that the insight exceeds the set of deviation thresholds for the set of benchmarks.

11. The computer system of claim 10, wherein the set of benchmarks is selected from the group consisting of organization benchmarks, industry benchmarks, and combinations thereof.

12. The computer system of claim 7, wherein determining whether the related information is relevant to the context of the operation to be performed further comprises:

identifying an association between the reports and metrics from the related information and both the operation and the context of the operation to be performed and wherein the reports and metrics from the related information comprise a member selected from the group consisting of underlying contributing factors, related insights, underlying reports, and combination thereof.

13. The computer system of claim 7, wherein the insight is an inference with regard to the human resources information extrapolated from the related information.

14. The computer system of claim 13, wherein the inference comprises a current state of the human resources information, based on information that is relevant to the human resources information in the context of performing the operation.

15. The computer system of claim 13, wherein the inference comprises a predicted change to the human resources information, based on information that is relevant to the human resources information in the context of performing the operation.

16. A computer program product comprising:

a non-transitory computer readable storage media including instructions configured to cause a database including information, a display system including a graphical user interface and a hardware processor to determine and display contextually relevant insights into human resources information, wherein the instructions comprise:

first program code for displaying, using the graphical user interface of the display system, human resources information from a human resources profile of an employee of an organization, wherein the human resources information is displayed within a context of an operation to be performed for the organization;

second program code for identifying, using the hardware processor, related information in the information of the database;

third program code for determining, using the hardware processor, whether the related information is relevant to the context of the operation to be performed;

fourth program code for, in response to determining that the related information is relevant to the context of the operation to be performed, generating, using the hardware processor, an insight into the human resources information based on a data point for the human resources information within the related information;

fifth program code for displaying, using the graphical user interface of the display system, the insight with the human resources information within the context of the operation to be performed, wherein performing the operation is enabled using the insight displayed with the human resources information;

sixth program code for comparing, using the hardware processor, the insight to a set of benchmarks in response to generating the insight into the human resources information;

seventh program code for determining, using the hardware processor, whether the insight exceeds a set of deviation thresholds for the set of benchmarks, wherein the set of deviation thresholds are rules associated with statistical variances defined by at least one of a set of organization benchmarks that are standards or points of reference internal to the organization against which the insight is compared and industry benchmarks that are standards or points of reference external to the organization against which the insight is compared; and eighth program code for when the insight exceeds the set of deviation thresholds for the set of benchmarks automatically performing, using the hardware processor, the operation for the organization, wherein the insight further comprises a graphical control that is displayed by the graphical user interface of the display system, wherein selection of the graphical control displays, by the graphical user interface, reports and metrics from the related information that are relevant to the context of the operation to be performed.

17. The computer program product of claim 16, wherein the human resources information comprises at least one of:
information related to a position of the employee within the organization;
information related to a status of the employee within the organization;
information related to a compensation of the employee by organization;
information related to a group of the organization to which the employee is assigned;
information related to an employment of the employee within the organization; or
information related to a work schedule of the employee at the organization.

18. The computer program product of claim 16, wherein the context of the operation to be performed comprises at least one of hiring operations, benefits administration operations, payroll operations, performance review operations, operations for forming teams for new products, or operations for assigning research projects.

19. The computer program product of claim 16, wherein the fifth program code further comprises:
ninth program code for displaying the insight with the human resources information in response to determining that the insight exceeds the set of deviation thresholds for the set of benchmarks.

20. The computer program product of claim 19, wherein the set of benchmarks comprises at least one of organization benchmarks, or industry benchmarks.

21. The computer program product of claim 16, wherein the third program code further comprises:
ninth program code for identifying an association between the reports and metrics from the related information and both the operation and the context of the operation to be performed;
wherein the reports and metrics from the related information comprise a member selected from the group consisting of underlying contributing factors, related insights, underlying reports, and combination thereof.

* * * * *